United States Patent [19]

Walter

[11] 4,381,959

[45] May 3, 1983

[54] METHOD OF SECURING AN END CLOSURE TO A CONTAINER BODY

[75] Inventor: John Walter, Evergreen Park, Ill.

[73] Assignee: Continental Packaging Company, Inc., Stamford, Conn.

[21] Appl. No.: 358,067

[22] Filed: Mar. 15, 1982

Related U.S. Application Data

[62] Division of Ser. No. 217,616, Dec. 18, 1980, Pat. No. 4,345,047.

[51] Int. Cl.$^3$ .......................... B32B 31/12; B65B 7/28
[52] U.S. Cl. .......................................... 156/69; 53/287; 53/478; 220/67; 428/35; 525/108
[58] Field of Search ............................ 156/69; 220/67; 525/108; 53/478, 287; 215/232; 428/35

[56] References Cited

U.S. PATENT DOCUMENTS

| | | | |
|---|---|---|---|
| 2,023,341 | 12/1935 | Downes-Shaw et al. | 156/69 X |
| 2,218,027 | 10/1940 | Hatch | 156/69 X |
| 3,100,160 | 8/1963 | Korpman | 525/108 |
| 3,312,754 | 4/1967 | Marks | 525/108 |
| 3,340,224 | 9/1967 | Sherman | 525/108 |
| 3,480,691 | 11/1969 | Jeff | 525/108 |
| 3,914,334 | 10/1975 | Lubowitz | 525/108 |
| 4,272,573 | 6/1981 | Ewald | 525/108 |

FOREIGN PATENT DOCUMENTS 52-21043  2/1977  Japan ................................. 525/108

*Primary Examiner*—Robert A. Dawson
*Attorney, Agent, or Firm*—Paul Shapiro

[57] ABSTRACT

An adhesive composition for bonding polished metal surfaces to vinyl chloride polymer coated metal substrates is disclosed which is comprised of a thermoplastic vinyl chloride polymer resin, a thermosetting epoxy resin normally incompatible with the vinyl chloride polymer resin and an amount of an acrylonitrile/butadiene/styrene copolymer which imparts compatibility between the epoxy resin and the vinyl chloride polymer.

8 Claims, No Drawings

METHOD OF SECURING AN END CLOSURE TO A CONTAINER BODY

This is a division of Ser. No. 217,616, filed Dec. 18, 1980 and now U.S. Pat. No. 4,345,047.

BACKGROUND OF THE INVENTION

1. Field of the Invention

This invention relates to an adhesive for metals and more particularly to an adhesive for metal containers in which the end and body members are joined through a lap seam.

2. The Prior Art

There has been developed metal containers formed from aluminum and steel of the two-piece type which are formed from a dome-shaped end member having a depending annular lip or skirt and a body member, the body member being a seamless cylinder having an integral bottom, the open end of the body member being formed to be inserted in telescoping relationship with the annular lip of the end, the overlapping sections of annular lip of the end and the open body section being bonded together to form a leakproof joint by the interposition of a suitable adhesive between the opposed faces of the end and open body sections.

In copending application Ser. No. 191,266, filed Sept. 26, 1980, in the name of Donald J. Roth, the disclosure of which is incorporated herein by reference, there is disclosed a two-piece container of this type suitable for use in the packaging of carbonated beverages such as beer and soft drinks wherein the end member is of a relatively short length compared with the body member, the end member being comprised of a conical section with a central pour opening and a toroidal peripheral section about the conical section and annular lip or skirt depending therefrom. The upper, open end of the body member is necked in to form an axially extending cylindrical portion or annulus of a diameter reduction to complementarily fit into the lip of the end, the outer surface of the annulus being adhesively bonded to the inner surface of the end lip to form a lap joint between the annulus and lip sections of the body and end members.

The end and body members have wall thicknesses less than 10 mils and are pliable without permanent deformity to accommodate laterally imposed loads. When the assembled container is filled with a carbonated beverage, the adhesively bonded end reacts to the internal forces generated by the pressurized beverage to expand into a spherical shape whereby the lip is caused to be beamed radially inwardly against the annulus section of the body. The forces tending to expand the end member are thereby utilized to produce a compressive force radially inwardly on the lip together with the tensile forces exerted by the pressurized beverage tending to expand the upper end of the body insures a parallelism between body and lip portions precluding the development of voids which would produce leaking joints. The force couple created between the lip and the necked in body portions causes the adhesive interposed therebetween to be held in compression whereby peeling forces on the bonded lap joint are minimized or substantially eliminated.

The construction of the two-piece containers disclosed in Ser. No. 191,226 lends itself to high speed production in which an adhesive composition dispersed in a volatile solvent is applied, using conventional coating techniques such as brush, roll coating or gravure coating, is either applied to the outer surface of the annulus of the necked in body section or to the inner surface of the end lip prior to assembly of the end and body members or both the annulus and the lip. After application of the adhesive, the coated member is heated to volatilize the solvent media in which the adhesive is dispersed and the end member is guided into an interference fit assembly with the annulus of the necked-in in body section. After assembly, the container is heated to an elevated temperature to the softening temperature of the adhesive to cause the adhesive to bond the assembled end and body members.

The high strength adhesives known to the art have not been totally successful in bonding the end and body portions of the two-piece containers discussed above for a number of reasons. Some of the major reasons are that although these adhesives have excellent cohesive strength, they are deficient either in their adhesion to the outer metal surface of the annulus or to the coated interior surface of the end lip.

The body member of the two-piece container of Ser. No. 191,226 is readily fabricated by the well-known drawn and wall ironing process. The body members fabricated by this process have outer wall surfaces which are highly polished and extremely smooth which makes it difficult to effectively bond thermoplastic adhesives such as polyvinylchloride to such surfaces. Although vinylchloride polymer adhesives are extremely compatible and will strongly bond to the vinylchloride polymer coatings conventionally used as interior coatings for beverage containers, such adhesives will not adhere effectively to the polished exterior surface of the drawn and wall ironed container body. As the construction of the two-piece container of Ser. No. 191,226 requires that the outer surface of the annulus of the necked in section of the body be overlapped and bonded to the interior coated surface of the end, thermoplastic adhesives such as polyvinylchloride, polyethylene, polypropylene do not form adhesive bonds with the reliability required in the manufacture of containers used in the packaging of carbonated beverages.

Attempts at using thermosetting resin compositions such as those based on epoxy resins have revealed that although such compositions will strongly adhere to polished metal surfaces of the character found on the outer surfaces of drawn and wall ironed container bodies, such adhesives do not have sufficient adhesion to coated metal surfaces of the type found in the interior surfaces of containers used for packaging carbonated beverages, e.g., vinyl chloride polymer coated metal substrates, to provide an adhesive bond of the reliability required in the manufacture of containers used for the packaging of carbonated beverages.

It would be desirable if the excellent adhesion of thermoplastic resins such as vinyl chloride polymers to internal coated metal surfaces could be combined with the polished surface adhesion of thermosetting resins such as epoxy resins to obtain an adhesive formulation which would adhere tenaciously both to polished metal surfaces as well as coated metal substrates.

Attempts to disperse a combination of thermosetting resins such as epoxy resins and thermoplastic resins such as vinyl chloride polymers in a common dispersion media have not been successful as the two resin types are incompatible with the result that unstable dispersions result which rapidly stratify on standing, thereby

SUMMARY OF THE INVENTION

In accordance with the present invention adhesive formulations are prepared by effecting the compatibility of thermoplastic vinyl chloride polymer resins and thermosetting epoxy resin formulations by the use of a third component compatible with both the thermosetting epoxy resin and the thermoplastic vinyl chloride polymer resin, the third component being an acrylontrile/butadiene/styrene (ABS) copolymer.

The adhesive formulation of the present invention may be obtained as a stable dispersion of resin solids in a fugitive organic solvent which may be applied as such to either the outer polished surface of a seamless drawn and wall ironed container body or the vinyl chloride organosol coated interior surface of an end member. After application, the container member is heated to volatilize the solvent. After assembly of the container members, the adhesive solids interposed between the opposed faces of the inner surface of a vinyl chloride polymer coated metal substrate and the outer surface of a polished metal member and the lap joint formed therebetween is thereafter heated to the softening temperature of ABS copolymer. The mixture of adhesive solids is caused to adhere tenaciously to the polished metal surface and the coated metal surface whereby a lap joint having exceptionally high bursting or hoop strength is achieved.

Examination of the metal surfaces to which the adhesive admixture of the present invention is applied indicates that upon heating the applied film of adhesive resin solids, the thermosetting epoxy resin is advanced rapidly to the insoluble stage because of the heat applied and forms adherent, individual particles of the thermoset epoxy resin on the polished metal surface area to which the adhesive dispersion is applied. The adherence of the thermoset particles on the smooth surfaced metal creates a roughened or sandpaper effect on the metal surface and provides anchor points on the metal surface whereby the thermoplastic resins in the admixture, still soft from the heated condition of the surface, are adhered to the anchored thermoset particles.

After the lap joint to which the adhesive has been applied is cooled, the solidified thermoplastic resins being anchored to the thermoset particles on the outer metal surface of the container body and adhesively adhered to the inner coated metal surface of the end cohesively bonds the joint to form a leakproof unitary structure.

PREFERRED EMBODIMENTS

The metal surfaces to which the adhesive compositions of the present invention may be applied include coated and uncoated aluminum or low carbon steel with or without an external plating of chromium, nickel or tin.

The term "vinyl chloride polymer" as used herein means resins produced by the polymerization of vinyl chloride or by copolymerization of vinyl chloride and minor amounts of other monomers such as vinyl acetate and esters of acrylic and methacrylic acids with the lower aliphatic alcohols up to n-butyl alcohols as well as hydrolyzed vinyl chloride-vinyl acetate copolymers and terpolymers such as vinyl chloride-vinyl acetate-maleic acid. The vinyl chloride copolymers used in the practice of the present invention are advantageously comprised of about 70 to about 95% by weight vinyl chloride and about 5 to about 25% by weight of the comonomer.

The epoxy resin component of the adhesive compositions of the present invention are complex polymeric epoxyhydroxy ethers resulting from the catalyzed reaction of a polyhydric phenol with an excess of an epoxide, e.g., epihalohydrins and alkylene oxides, as described in U.S. Pat. Nos. 2,456,408 and 2,592,560. The principal product of this reaction is a resinous epoxy glyceryl polyether comprising epoxy glyceryl (glycidyl) radicals or hydroxyl substituted glyceryl racicals alternating with the divalent residue of the polyhydric phenol, which radicals are united in a chain through ether oxygen atoms.

In the present invention, those epoxy resins which are of relatively high molecular weight are utilized in preparing the adhesive composition. Generally, epoxy resins having an average molecular weight in the range of 1400 to 5000 may be used.

Epoxy resins are available commercially. Preferred examples are EPON 1004 and EPON 1007, products of Shell Chemical Company, which are the condensation products of epichlorhydrin and Bisphenol A (dihydroxy-diphenyl-dimethyl methane) and have a respective epoxy assay of 875 to 1025 and 2500 to 4000 grams of sample per gram mole of epoxy group (gram/gram mole). The average molecular weight of an epoxy resin is approximately twice the epoxy assay.

To accelerate hardening during the period the adhesive composition is heated, the epoxy resin is combined with a minor amount of a heat activatable aminoplast cross-linking resin. Generally about 70 to about 90 percent by weight of the epoxy resin is combined with about 10 to about 30 percent by weight of the aminoplast resin when the epoxy resin is used as a component in the adhesive compositions of the present invention.

Examples of aminoplast resins include urea-aldehyde and triazine aldehyde resins and alcohol modified derivatives thereof, that is, alkylated amino resins wherein the alkyl radical contains from 2 to 8 carbon atoms. Such aminoplast resins are the reaction products of aldehydes, for instance formaldehyde, acetaldehyde and the like, with urea, substituted ureas, thioureas, ethylene urea, melamine, benzoquanamine, acetoguanamine and the like. The resulting methylol substituted products are etherified with alcohols, for example isopropanol, butanol and 2-ethyl hexanol, in order to obtain stability and organic solubility. Such organic soluble aminoplast resins are contemplated for use in this invention and butylated urea formaldehyde resins are preferred for use in the practice of the present invention.

The ABS copolymers used in the practice of the present invention are known to the art. The ABS copolymers are thermoplastic polymers produced either by blending styrene-acrylonitrile copolymer resins with butadiene based elastomers or by grafting styrene and acrylonitrile monomers onto polybutadiene or butadiene-styrene or butadiene-acrylonitrile copolymers. The specific procedures for preparing ABS graft copolymers are also well known to the art, e.g., U.S. Pat. Nos. 2,908,661 and U.S. 3,496,250. A graft copolymer is a polymer prepared by first polymerizing a monomer (or a mixture of monomers) with subsequent polymerization of a second monomer or group of monomers onto the product of the first polymerization. The first polymerization prepares what is hereinafter referred to as the rubbery backbone.

The specific graft copolymers utilized in this invention are prepared by first polymerizing a conjugated diene such as butadiene in the presence of a monovinyl aromatic hydrocarbon such as styrene and/or acrylonitrile to provide a polymerized diene rubbery backbone. Thereafter, a second monomer or group of monomers are grafted onto the rubbery backbone to complete the graft copolymer. This is accomplished by the addition and interaction under polymerization conditions of an acrylonitrile, substituted acrylonitrile and a monovinyl aromatic hydrocarbon exemplified by acrylonitrile and styrene.

The backbone, i.e., conjugated diene polymer or copolymer, is prepared so as to comprise about 10% by weight to about 60% by weight and preferably 10 to about 30% by weight of the total copolymer composition and the acrylonitrile and styrene monomers that are polymerized in the presence of the backbone polymer or copolymer comprises from about 40% by weight to about 90% by weight of the total composition.

The acrylonitrile or component of the copolymer preferably comprises about 10 to about 30% by weight of the three-component organic mixture and the styrene component comprises from about 40 to about 70% by weight of the total composition.

The term styrene when used in the present application includes within its meaning styrene, α-methylstyrene, vinyl toluene, vinyl xylene, ethylvinylbenzene, isopropylstyrene, chlorostyrene, dichlorostyrene, ethylchlorostyrene and mixtures thereof.

The term acrylonitrile when used in the present application includes within its meaning acrylonitrile, methacrylonitrile, chloroacrylonitrile and mixtures thereof.

ABS graft copolymers are commercially available. An ABS graft copolymer sold under the tradename Cycolac GSM and available from the Borg Warner Corporation has a composition determined to consist of 54.5±2.0% styrene, 21.5±2.0% acrylonitrile and 24.5±1.0% butadiene. Other ABS graft copolymers available from the Borg Warner Corporation include Cycolac ADG which consists of 60.5±2.0% styrene, 20.5±2.0% acrylonitrile and 18.0±2.0% butadiene and Cycolac DFA which consists of 59.5±2.0% styrene, 20.5±2.0% acrylonitrile and 19.0±2.0% butadiene.

When used in the manufacture of containers in the practice of the present invention the selection of proportions of thermosetting epoxy resin, vinyl chloride polymer resin and ABS copolymer depends on the character and type of the metal surface, the thickness of the adhesive film required for cohesion of the lap joint and the limits of compatibility between the thermosetting epoxy resin and the thermoplastic vinyl chloride polymer resin.

The quantity of the thermosetting epoxy resin present in the adhesive composition of the present invention should be at least about 5% based on the solids weight of the adhesive composition so that there is an adequate amount of the resin material to create the roughened, sandpaper effect on the polished metal surface in which the adhesive is in contact during the heating of the lap joint. Generally the thermosetting epoxy resin comprises about 5 to 30% by weight of the solids content of the adhesive composition and preferably about 10 to about 20% by weight. If an amount of epoxy resin in excess of 30% by weight is used in the adhesive formulation of the present invention, the sandpaper effect is lost and poor adhesion of the vinyl chloride polymer to the metal surface results.

The quantity of the thermoplastic vinyl chloride polymer present in the adhesive composition of the present invention should be at least about 10% by weight based on the solids weight of the adhesive composition so that there is an adequate amount of the vinyl chloride polymer to cohesively adhere the opposed surfaces of the lap joint. Generally the vinyl chloride polymer comprises about 15 to about 70% by weight of the solids content of the adhesive composition and preferably about 20 to about 65% by weight.

The adhesive composition of the present invention is applied as a dispersion of the epoxy and vinyl chloride polymer resins in a fugitive organic liquid. The quantity of the ABS resin incorporated in the adhesive composition of the present invention should be as least about 20% by weight based on the solids weight of the adhesive composition. The incorporation of the ABS copolymer in the adhesive dispersion is critical to obtaining a stable dispersion of the vinyl chloride polymer and epoxy resins. In the absence of the ABS copolymer, the vinyl chloride polymer and epoxy resin components of the dispersion begin to stratify and separate from the dispersion about ¼ hours after the dispersion is prepared whereas when the ABS copolymer is present in the adhesive dispersion no stratification or other separation of the solids components occurs even 5 days after preparation of the dispersion. Generally the thermoplastic ABS copolymer comprises about 20 to about 85% by weight of the solids content of the adhesive composition and preferably about 30 to about 50% by weight.

The resin solids present in the adhesive dispersions of the present invention is comprised of about 5 to about 30% by weight and preferably about 10 to about 20% by weight of the epoxy resin, about 0.25 to about 7.5% by weight and preferably about 1 to about 6% by weight of an aminoplast condensate cross-linking agent, about 10 to about 70% by weight and preferably about 20% to about 65% by weight of the vinyl chloride polymer and about 20 to about 85% by weight and preferably about 30 to about 75% by weight of the ABS copolymer.

The solvent compositions in which the resin components of the adhesive composition of the present invention are dispersed are not especially critical. It is necessary, however, that the solvents be volatile at the temperatures at which the lap joint is heated after application thereto of the adhesive dispersion. Suitable solvents comprise aryl or aralkyl hydrocarbons blended with oxygen containing solvents such as alcohols, ketones, ethers or esters and mixtures thereof. Alcohols, ketones, ethers and esters or mixtures thereof can be used with or without the aryl or aralkyl hydrocarbons. Solvent systems comprising a mixture of aryl or aralkyl hydrocarbons and alcohols yield dispersions having optimum viscosity for application and for this reason are preferred.

Examples of the aromatic hydrocarbon solvents are xylene, toluene and petroleum fractions having a boiling range of 120° to 200° C. Examples of suitable oxygen containing solvents are acetone, methyl ethyl ketone, butanol, diacetone alcohol, isophorone, methyl isobutyl ketone, nitropropane, butyl cellosolve, tetrahydrofuran, cyclohexanone, amyl acetate, methyl cellosolve acetate, diisobutyl ketone and cyclohexanol.

The solvents selected to prepare the adhesive dispersion should be capable of forming a common dispersion medium of the individual resin components of the adhesive composition and for this purpose different solvent media may be employed for the resin components insofar as such solvent media will blend or mix together and carry their respective solutes compatibly into the common dispersion.

In preparing the adhesive dispersion, the vinyl chloride polymer resin, epoxy resin and acrylonitrile/butadiene/styrene copolymer are separately dissolved in suitable solvent systems formed of solvents selected from among those mentioned above and they are combined to obtain an adhesive dispersion suitable for application to the surfaces of the end and body components which are to be overlapped to form two-piece containers.

The adhesive compositions of this invention can be satisfactorily applied at a solids content ranging from about 15 to about 40% by weight, based on the total weight of the dispersion. Generally, a solids content of about 20 to about 30% by weight is preferred.

The dispersion can be satisfactorily applied by any of the conventional methods employed in the coating industry. However, brush, gravure or direct roller coating are preferred methods, as the desired adhesive weight is easily and conveniently applied. Spraying, dipping and flow coating are also useful methods of applying the adhesive dispersion.

In the fabrication of two-piece containers using the adhesive composition of the present invention the adhesive is applied either to the outer surface of the annulus of the necked in section of the container body or to the inner surface of the lip of the end prior to the assembly of the end to the annulus of the body member or both so that after assembly the assembled container is heated to effect hardening of the epoxy resin component of the adhesive during which time the end and body members of the assembled container may be moved axially or circumferentially relative to each other to eliminate any pinholes or the like formed in the adhesive and to promote good adhesion of the adhesive solids to the metal members. Upon cooling, the solidified thermoplastic resin components of the adhesive bond the overlapped metal members together.

The heating condition to which the overlapped joint is exposed to effect hardening of the epoxy resin and volatilization of the dispersion solvents is normally a temperature of about 175° to about 320° C. for a period of about 20 minutes to about 1 minute.

The adhesive film thickness generally employed for bonding the lapped metal parts is in the range of about 0.001 to 0.003 inches.

The following example is set forth merely as an illustration of the invention and is not intended to limit the scope thereof.

EXAMPLE

Resin solutions were prepared as follows:

| | | Percent by Wt. |
|---|---|---|
| (A) | EPOXY RESIN SOLUTION | 17.0 |
| | (20% Solids) | |
| | Solids | |
| | Epichlorohydrin-Bisphenol A | |
| | Urea-Formaldehyde Resin | 3.0 |
| | Solvents | |
| | Toluene | 41.3 |
| | Isopropyl alcohol | 18.5 |
| | Diacetone alcohol | 10.9 |

| | | Percent by Wt. |
|---|---|---|
| | Xylene | 6.8 |
| | Butyl Cellosolve | 1.7 |
| | n-butanol | 1.7 |
| (B) | VINYL CHLORIDE POLYMER SOLUTION (37.5% Solids) | |
| | Solids | |
| | Polyvinylchloride | 22.5 |
| | Vinylchloride/vinylacetate copolymer | 11.3 |
| | Phenol-formaldehyde resin* | 3.8 |
| | Solvents | |
| | Solvesso 150 (aromatic) | 27.3 |
| | Cellosolve acetate | 13.6 |
| | Dibutyl ketone | 9.1 |
| | Butyl carbitol | 2.3 |
| | Xylene, butyl alcohol | Remainder |
| (C) | ACRYLONTRILE/BUTADIENE/STYRENE COPOLYMER SOLUTION (45% Solids) | |
| | Component | |
| | Acrylonitrile/butadiene/styrene graft copolymer (Cycolac GSM) | 45 |
| | Acetone | 55 |

*Heat stabilizer

Varying amounts of the three resin solutions A, B and C were then combined to prepare adhesive dispersions as follows:

| Adhesive Dispersion No. | Component A | | | Component B | | | Component C | | |
|---|---|---|---|---|---|---|---|---|---|
| | Liq. % by wt. | Parts Solids | Wt. % of Total | Liq. % by wt. | Parts Solids | Wt. % of Total | Liq. % by wt. | Parts Solids | Wt. % of Total |
| 1 | 20 | 4.0 | 10.8 | 30 | 15.0 | 40.5 | 40 | 18.0 | 48.7 |
| 2 | 20 | 4.0 | 11.3 | 60 | 22.5 | 63.4 | 20 | 9.0 | 25.3 |
| 3 | 20 | 4.0 | 10.4 | 20 | 7.5 | 19.5 | 60 | 27.0 | 70.1 |
| 4 | 30 | 6.0 | 17.0 | 30 | 11.25 | 31.9 | 40 | 18.0 | 51.1 |
| 5 | 30 | 6.0 | 17.4 | 40 | 15.0 | 43.5 | 30 | 13.5 | 39.1 |
| 6 | 33.3 | 6.67 | 19.5 | 33.3 | 12.5 | 36.6 | 33.3 | 15.0 | 43.9 |
| 7 | 30 | 6.0 | 17.8 | 50 | 18.75 | 55.5 | 20 | 9.0 | 26.7 |

The admixture of the resin solutions was agitated to prepare a stable dispersion of resin components. No separation of resin components was noted 5 days after preparation of the dispersions whereas in similarly prepared dispersions in which the ABS copolymer was not included resin component separation was noted after about 2 hours.

Adhesive dispersions Nos. 1-7 were used to bond the end and body members of 6 ounce two-piece containers formed of 3004-H19 aluminum in which portions of a domed end and one-piece seamless body members were assembled, overlapped and bonded to each other to form the container. The body member was a polished, seamless cylinder of 4 13/16 inch length, 2⅛ inch diameter and 10 mils thickness having an integral bottom. The body member at its upper end was necked in to provide a radially inwardly extending shoulder about 1/16 inch wide and about the inner portion of which extended an annulus of approximately ⅛ inch in length. The outer surface of the body member had a smooth, polished surface. The annulus of the necked in section was adapted for an interference fit into the lower lip portion of the domed end, the lip portion being about 0.837 inch in total axial depth.

The domed end was interiorly coated with a polyvinyl chloride resin. Adhesive dispersions Nos. 1-7 were applied to the outer surface of the annulus by brush coating whereby an adhesive film of 0.002 inches thick was applied to the annulus and then baked for 2 minutes in an oven set at 170° C. to evaporate the solvent and partially cure the epoxy component of the adhesive and partially fuse the thermoplastic components. The end was then entered over the annulus of the necked in section of the body so that the annulus and lip sections of the end and body members were in an overlapping relationship to form a lap joint.

Upon assembly the end and body members were moved axially relative to each other to eliminate any pinholes or other defects in the applied adhesive.

The assembled containers were then heated in an oven set at a temperature of 210° C. and held there for 2 minutes to fully cure and fuse the components of the adhesive mixture. The containers were then removed from the oven and air cooled to room temperature. Examination of the cooled containers indicated that the ends were securely bonded to the container body.

The strength of the adhesive joint between the end and body members was tested by pressurizing the container to an internal pressure of 180 psi. At this pressure the walls of the container split open before any separation of the joint members occurred.

What is claimed is:

1. A method of securing a metal end closure having a depending annular wall to an open end of a metal container body which comprises
   applying an adhesive to a surface of the annular wall of the end closure and the container body, the adhesive being comprised of a homogeneous dispersion in a volatile organic solvent of a mixture of about 10 to about 70% by weight of a thermoplastic vinyl chloride polymer resin and about 5 to about 30% by weight of a thermosetting epoxy resin normally incompatible with the vinyl chloride polymer resin and an amount of about 20 to about 85% by weight of an acrylonitrile/butadiene/styrene copolymer which amount of copolymer is capable of imparting compatibility between the epoxy resin and the vinyl chloride polymer, the copolymer containing about 10 to about 30% by weight acrylonitrile, about 10 to about 30% by weight butadiene and about 40 to about 70% by weight styrene;
   heating the adhesive coated surfaces to volatilize the solvent, soften the thermoplastic resins and harden the epoxy resin;
   overlapping the annular wall portion of the end closure on the open end of the container body to form a lap seam assembly;
   cooling the assembly whereby the opposed surfaces of the assembly are bonded together by the adhesive solids remaining in the assembly.

2. The method of claim 1, wherein the adhesive composition of claim 1 wherein the vinyl chloride polymer is polyvinyl chloride.

3. The method of claim 1 wherein the vinyl chloride polymer is a vinyl chloride/vinyl acetate copolymer.

4. The method of claim 1 wherein the epoxy resin is epichlorohydrin-Bisphenol A.

5. The method of claim 1 wherein an aminoplast condensate is incorporated in the adhesive composition.

6. The method of claim 1 wherein the exterior surface of the open end of the container is smooth, polished metal.

7. The method of claim 1 wherein the surface of the interior surface of the overlapped annular wall portion of the closure is coated with a layer of a vinyl chloride polymer.

8. The method of claim 7 wherein the vinyl chloride polymer component is polyvinyl chloride.

* * * * *